United States Patent
Kitaguchi et al.

(10) Patent No.: US 10,057,437 B2
(45) Date of Patent: Aug. 21, 2018

(54) IMAGE PROCESSING APPARATUS, OPERATION ASSISTANCE METHOD, AND NON-TRANSITORY COMPUTER-READABLE RECORDING MEDIUM ENCODED WITH OPERATION ASSISTANCE PROGRAM

(71) Applicant: KONICA MINOLTA, INC., Chiyoda-ku, Tokyo (JP)

(72) Inventors: Tatsuya Kitaguchi, Toyokawa (JP); Takashi Oikawa, Toyohashi (JP); Tomoyuki Atsumi, Toyohashi (JP); Takanobu Sugiyama, Toyokawa (JP); Shumpei Iwaoka, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 37 days.

(21) Appl. No.: 15/074,215

(22) Filed: Mar. 18, 2016

(65) Prior Publication Data

US 2016/0277606 A1 Sep. 22, 2016

(30) Foreign Application Priority Data

Mar. 22, 2015 (JP) ................................. 2015-058834

(51) Int. Cl.
*H04N 1/00* (2006.01)

(52) U.S. Cl.
CPC ..... *H04N 1/00419* (2013.01); *H04N 1/00411* (2013.01); *H04N 1/00458* (2013.01); *H04N 2201/0094* (2013.01)

(58) Field of Classification Search
CPC .............................. G06F 3/123; G06F 3/1209
See application file for complete search history.

(56) References Cited

U.S. PATENT DOCUMENTS

2010/0083115 A1* 4/2010 Park .................. H04N 21/4312 715/721
2012/0243017 A1 9/2012 Machida
(Continued)

FOREIGN PATENT DOCUMENTS

| JP | 2007-111875 A | 5/2007 |
| JP | 2008-180833 A | 8/2008 |

(Continued)

OTHER PUBLICATIONS

Office Action (Notice of Ground of Rejection) dated Mar. 14, 2017, by the Japanese Patent Office in corresponding Japanese Patent Application No. 2015-058834 and an English Translation of the Office Action. (8 pages).

*Primary Examiner* — Fan Zhang
(74) *Attorney, Agent, or Firm* — Buchanan Ingersoll & Rooney PC

(57) ABSTRACT

A processor included in an image processing apparatus includes a display control portion configured to display any one of a plurality of operation screens in the display, a setting portion configured to control the operation panel, accept a setting value defined for the displayed operation screen, and set the setting value, an operation screen extraction portion configured to search screen information respectively associating one or more search indexes with one or more operation screens among the plurality of operation screens using a search key and extract one or more operation screens, an operation screen determination portion configured to determine one operation screen from among the one or more extracted operation screens, and a change portion configured to change the screen information based on an operation of a user accepted by the operation panel after the determined operation screen is displayed in the display.

15 Claims, 12 Drawing Sheets

SEARCH TABLE

| OPERATION SCREEN | SEARCH INDEX | FIRST PRIORITY |
|---|---|---|
| PAGE COLLECTION | 2in1 | 1 |
| | 4in1 | 1 |
| | COLLECTION | 1 |
| | PAPER | 2 |
| | SAVE | 1 |
| DOCUMENT | TWO SIDES | 1 |
| | ONE SIDE | 1 |
| | SAVE | 2 |
| PAPER | SIZE | 1 |
| | TWO SIDES | 2 |
| | ONE SIDE | 2 |
| | PAPER | 1 |
| | SAVE | 3 |
| COLOR | MONOCHROME | 1 |
| | GREY | 1 |
| | COLOR | 1 |
| | SAVE | 4 |

PRIORITY TABLE

| OPERATION SCREEN | SECOND PRIORITY |
|---|---|
| PAGE COLLECTION | 4 |
| DOCUMENT | 3 |
| PAPER | 2 |
| COLOR | 1 |

(56) References Cited

U.S. PATENT DOCUMENTS

2014/0173460 A1\* 6/2014 Kim .................. H04L 51/18
  715/753
2015/0058747 A1 2/2015 Tetsuhashi

FOREIGN PATENT DOCUMENTS

JP 2012-203152 A 10/2012
JP 2014-199667 A 10/2014

\* cited by examiner

FIG. 5

SEARCH TABLE

| OPERATION SCREEN | SEARCH INDEX | FIRST PRIORITY |
|---|---|---|

FIG. 6

PRIORITY TABLE

| OPERATION SCREEN | SECOND PRIORITY |
|---|---|

FIG. 7

FIRST TRANSITION COUNT TABLE

| FIRST OPERATION SCREEN | SEARCH KEY | FIRST TRANSITION TIME |
|---|---|---|

FIG. 8

SECOND TRANSITION COUNT TABLE

| SECOND OPERATION SCREEN | SEARCH KEY | SECOND TRANSITION TIME |
|---|---|---|

F I G. 9 A
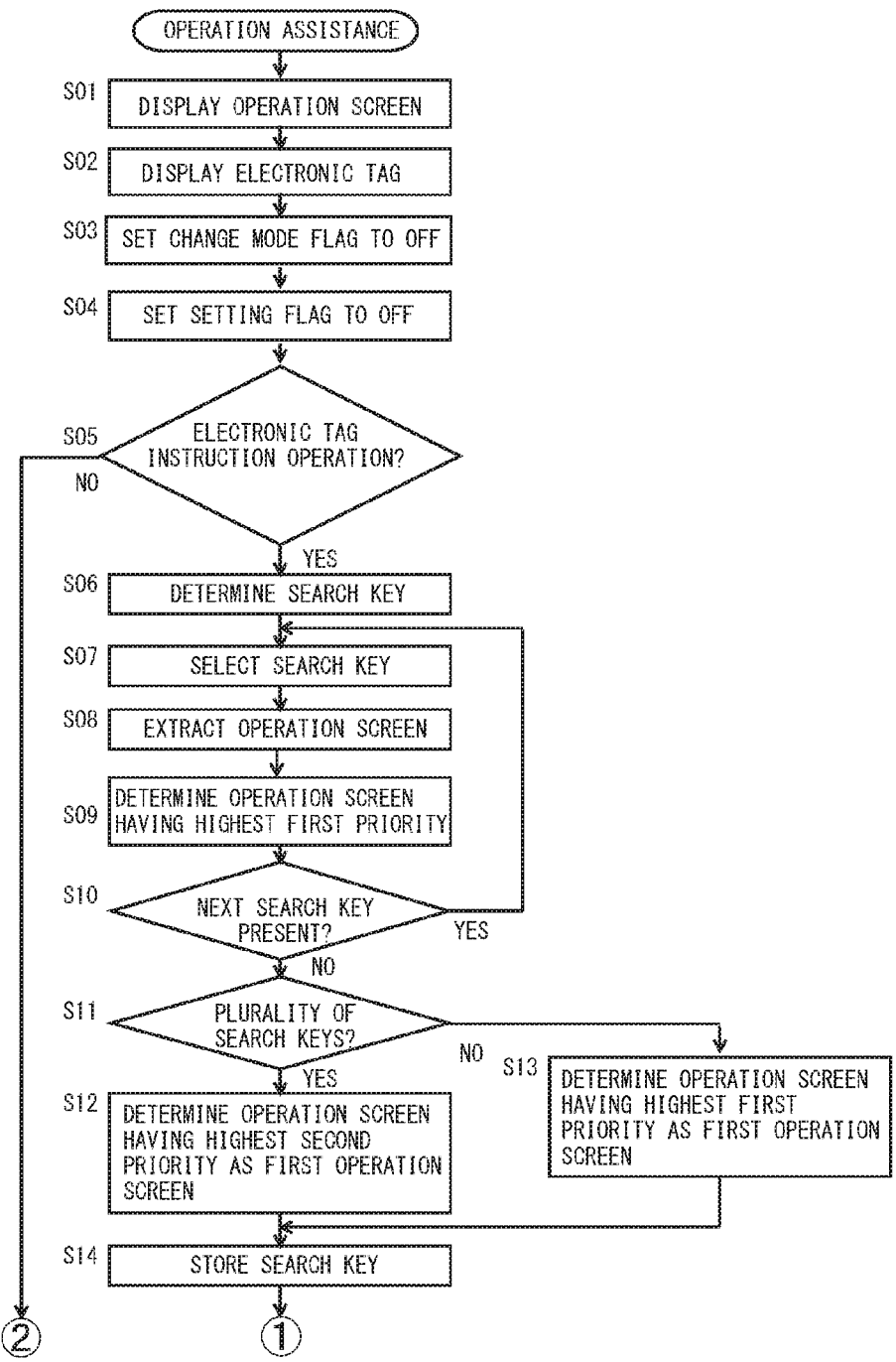

FIG. 13

SEARCH TABLE

| OPERATION SCREEN | SEARCH INDEX | FIRST PRIORITY |
|---|---|---|
| PAGE COLLECTION | 2in1 | 1 |
|  | 4in1 | 1 |
|  | COLLECTION | 1 |
|  | PAPER | 2 |
|  | SAVE | 1 |
| DOCUMENT | TWO SIDES | 1 |
|  | ONE SIDE | 1 |
|  | SAVE | 2 |
| PAPER | SIZE | 1 |
|  | TWO SIDES | 2 |
|  | ONE SIDE | 2 |
|  | PAPER | 1 |
|  | SAVE | 3 |
| COLOR | MONOCHROME | 1 |
|  | GREY | 1 |
|  | COLOR | 1 |
|  | SAVE | 4 |

FIG. 14

PRIORITY TABLE

| OPERATION SCREEN | SECOND PRIORITY |
|---|---|
| PAGE COLLECTION | 4 |
| DOCUMENT | 3 |
| PAPER | 2 |
| COLOR | 1 |

IMAGE PROCESSING APPARATUS, OPERATION ASSISTANCE METHOD, AND NON-TRANSITORY COMPUTER-READABLE RECORDING MEDIUM ENCODED WITH OPERATION ASSISTANCE PROGRAM

This application is based on Japanese Patent Application No. 2015-058834 filed with Japan Patent Office on Mar. 22, 2015, the entire content of which is hereby incorporated by reference.

BACKGROUND OF THE INVENTION

Field of the Invention

The present invention relates to an image processing apparatus, an operation assistance method, and a non-transitory computer-readable recording medium encoded with an operation assistance program. More specifically, the present invention relates to the image processing apparatus that displays one operation screen selected from among a plurality of operation screens, the operation assistance method performed in the image processing apparatus, and a non-transitory computer-readable recording medium encoded with the operation assistance program.

Description of the Related Art

An image forming apparatus that is represented by a Multi Function Peripheral (hereinafter referred to as an "MFP") has multiple functions. In order to allow the image forming apparatus to perform the functions, an operation screen for setting a setting value corresponding to the function to be performed must be selected from among a plurality of operation screens, and a setting value must be set. Thus, an operation of selecting an operation screen desired by a user is sometimes difficult. As a technique for solving this problem, Japanese Patent Laid-Open No. 2007-111875 describe an image forming apparatus that includes an image forming unit, an operation unit having an image display unit for displaying a multi-layer function operation screen, keyword searching means of searching a corresponding function from a list of various types of functions based on a keyword input by keyword input means, and first display means of, when the function searched by the keyword search means is displayed in the image display unit and a predetermined function is designated from the functions displayed in this image display unit, displaying a first virtual finish state in which it is assumed that this designated function has been performed in the image display unit as an image.

In the image forming apparatus described in Japanese Patent Laid-Open No. 2007-111875, the corresponding function is searched from the list of various types of functions based on the keyword. However, in the case where the function is searched by the same keyword, the same search result is output. Therefore, in order to display the operation screen desired by the user, an appropriate keyword must be input. Thus, there was a problem that it required practice to select a keyword.

SUMMARY OF THE INVENTION

According to one aspect of the present invention, an image processing apparatus includes a display that displays an image, an operation panel, and a processor, wherein the processor includes a display control portion configured to display any one of a plurality of operation screens in the display, a setting portion configured to control the operation panel, accept a setting value defined for the displayed operation screen, and set the accepted setting value, an operation screen extraction portion configured to search screen information respectively associating one or more search indexes with one or more operation screens among the plurality of operation screens using a search key and extract one or more operation screens, an operation screen determination portion configured to determine one operation screen from among the one or more extracted operation screens, and a change portion configured to change the screen information based on an operation of a user accepted by the operation panel after the determined operation screen is displayed in the display.

According to another aspect of the present invention, an operation assistance method allowing an image processing apparatus to perform a display control step of displaying any one of a plurality of operation screens, a setting step of accepting a setting value defined for the displayed operation screen and setting the accepted setting value, an operation screen extraction step of searching screen information respectively associating one or more search indexes with one or more operation screens among the plurality of the operation screens using a search key and extracting one or more operation screens, an operation screen determination step of determining one operation screen from among the one or more extracted operation screens, and a change step of changing the screen information based on an operation of a user accepted after the determined operation screen is displayed.

According to yet another aspect of the present invention, a non-transitory computer-readable recording medium encoded with an operation assistance program executed by a hardware processor controlling an image processing apparatus, wherein the operation assistance program causes the hardware processor to execute a display control step of displaying any one of a plurality of operation screens, a setting step of accepting a setting value defined for the displayed operation screen and setting the accepted setting value, an operation screen extraction step of searching screen information respectively associating one or more search indexes with one or more operation screens among the plurality of the operation screens using a search key and extracting one or more operation screens, an operation screen determination step of determining one operation screen from among the one or more extracted operation screens, and a change step of changing the screen information based on an operation of a user accepted after the determined operation screen is displayed.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 5 is a diagram showing one example of a format of a search table;

FIG. 6 is a diagram showing one example of a format of a priority table;

FIG. 7 is a diagram showing one example of a format of a first transition count table;

FIG. 8 is a diagram showing one example of a format of a second transition count table;

FIG. 9A is a flow chart showing one example of a flow of an operation assistance process;

FIG. 13 is a diagram showing one example of a search table;

FIG. 14 is a diagram showing one example of a priority table; and

DESCRIPTION OF THE PREFERRED EMBODIMENTS

Figure 1:
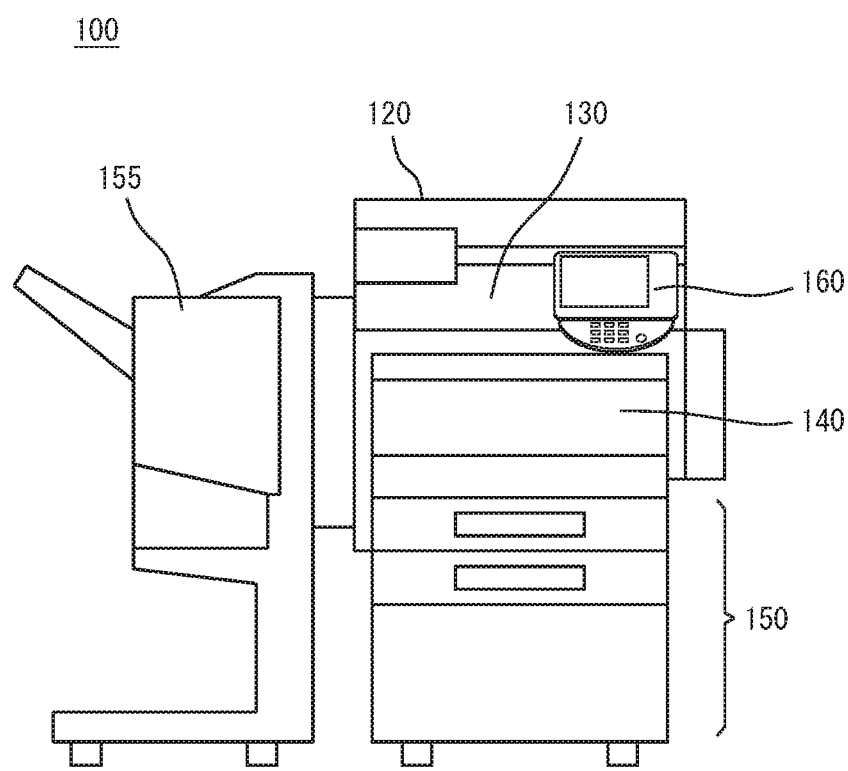
FIG. 1 is a diagram showing an appearance of an MFP in one embodiment of the present invention.

The preferred embodiments of the present invention will be described below with reference to drawings. In the following description, the same or corresponding parts are denoted by the same reference characters. Their names and functions are also the same. Thus, a detailed description thereof will not be repeated.

Figure 2:
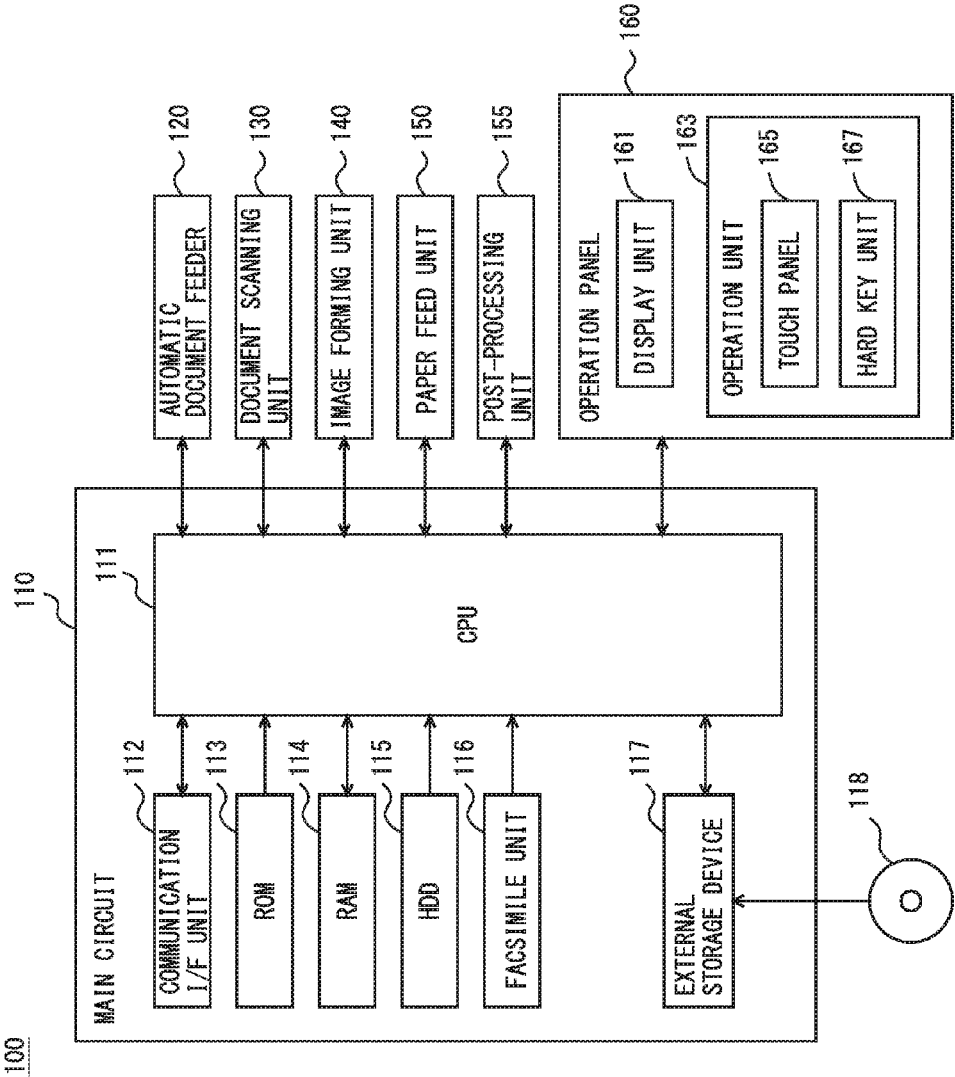
FIG. 2 is a block diagram showing an outline of a hardware configuration of the MFP.

FIG. 1 is a diagram showing an appearance of an MFP in one embodiment of the present invention. FIG. 2 is a block diagram showing an outline of a hardware configuration of the MFP. Referring to FIGS. 1 and 2, the MFP (Multi Function Peripheral) 100 functions as an image processing apparatus, and includes a main circuit 110, a document scanning unit 130 for scanning a document, an automatic document feeder 120 for conveying a document to document scanning unit 130, an image forming unit 140 for forming an image on paper or other medium based on image data output by the document scanning unit 130 scanning a document, a paper feed unit 150 for supplying paper to the image forming unit 140, and a post-processing unit 155 for processing paper on which an image is formed, and an operation panel 160 serving as a user interface.

The post-processing unit 155 performs a sorting process of rearranging and ejecting one or more paper on which an image is formed by the image forming unit 140, a punching process of punching holes into the paper, and a stapling process of putting staples into the paper.

The main circuit 110 includes a CPU 111, a communication interface (I/F) unit 112, a ROM 113, a RAM 114, and a hard disk drive (HDD) 115 used as a mass storage device, a facsimile unit 116, and an external storage device 117 to which a CD-ROM (Compact Disk ROM) 118 is attached. The CPU 111 is connected to the automatic document feeder 120, the document scanning unit 130, the image forming unit 140, the paper feed unit 150, the post-processing unit 155, and the operation panel 160, and controls the entire MFP 100.

The ROM 113 stores a control program executed by the CPU 111 or necessary data for executing the program. The RAM 114 is used as a work area when the CPU 111 executes the program. Further, the RAM 114 temporarily stores scan data (image data) successively sent from the document scanning unit 130.

The Communication I/F unit 112 is an interface for connecting the MFP 100 to a network. The CPU 111 communicates with another computer connected to the network via the communication I/F unit 112 to transmit and receive data. Further, the communication I/F unit 112 can communicate with a computer connected to the internet via the network.

The facsimile unit 116 is connected to a Public Switched Telephone Network (PSTN) to transmit facsimile data to the PSTN or receive facsimile data from the PSTN. The facsimile unit 116 stores the received facsimile data in the HDD 115 or outputs the received facsimile data to the image forming unit 140. The image forming unit 140 prints the facsimile data received from the facsimile unit 116 on paper. Further, the facsimile unit 116 converts data stored in the HDD 115 into facsimile data and transmits the converted facsimile data to a facsimile machine connected to the PSTN.

The CD-ROM 118 is attached to the external storage device 117. The CPU 111 can access the CD-ROM 118 via the external storage device 117. The CPU 111 loads a program recorded on the CD-ROM 118 attached to the external storage device 117 into the RAM 114 for execution. The program to be executed by the CPU 111 can be stored not only in the CD-ROM 118 but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program to be executed by the CPU 111 is not limited to a program recorded on the CD-ROM 118. A program stored in the HDD 115 may be loaded into the RAM 114 for execution. In this case, another computer connected to the network may overwrite the program stored in the HDD 115 of the MFP 100 or additionally write a new program. Further, the MFP 100 may download a program from another computer connected to the network and store the program in the HDD 115. The program referred to here includes a control program, and an operation assistance program included in the control program, and includes not only a program directly executable by the CPU 111 but also a source program, a compressed program, and an encrypted program.

Figure 3:
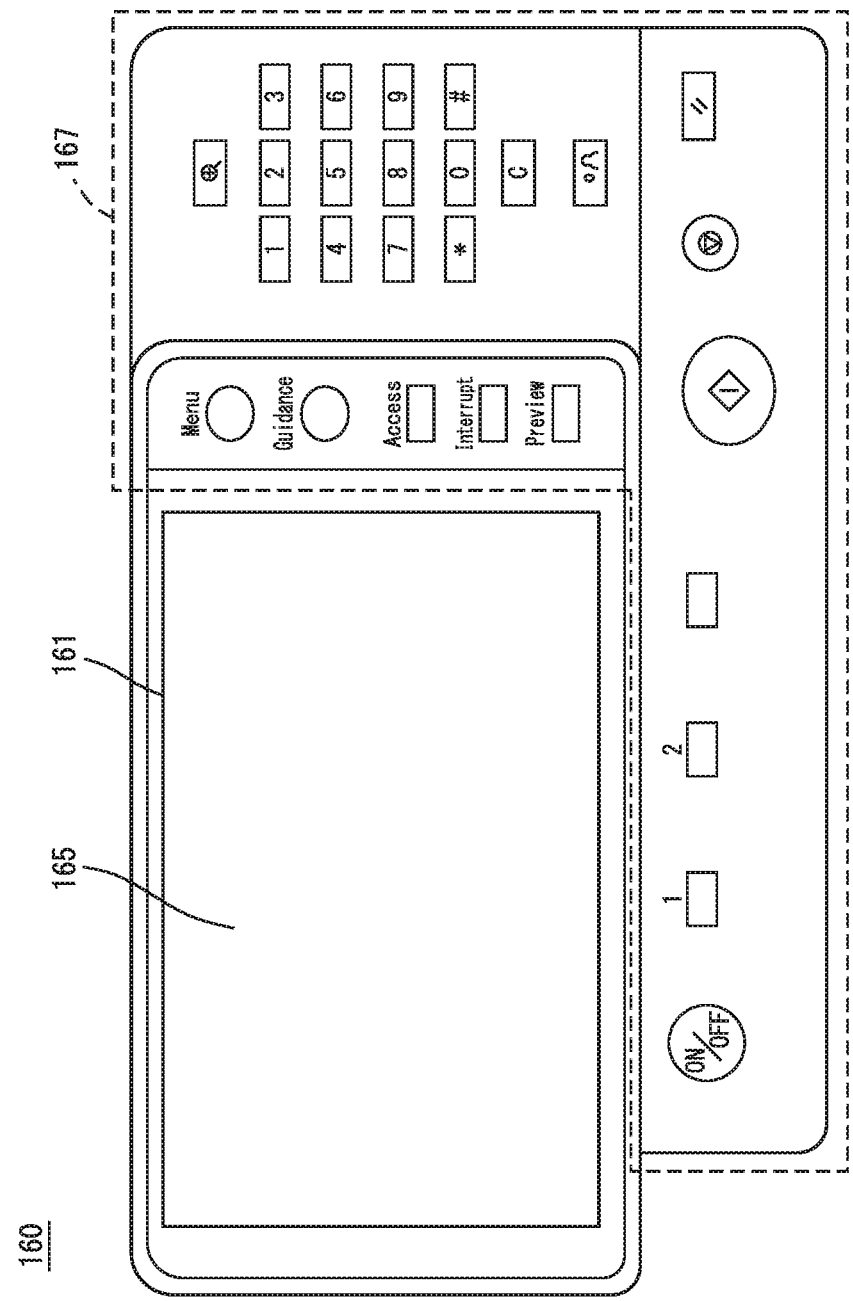
FIG. 3 is a plan view showing one example of an operation panel.

The operation panel 160 is provided on an upper surface of the MFP 100. FIG. 3 is a plan view showing one example of the operation panel. A dotted line in FIG. 3 is provided to show a region in which a hard key unit 167 is arranged in the operation panel 160, and does not actually exist. Referring to FIG. 3, the operation panel 160 includes a display unit 161 and an operation unit 163. The display unit 161 is a liquid crystal display (LCD), for example, and displays instruction menus to a user or information about the acquired image data.

The operation unit 163 includes a touch panel 165 and the hard key unit 167. The touch panel 165 is superimposed on an upper surface or a lower surface of the display unit 161. The hard key unit 167 includes a plurality of hard keys. The hard keys are contact switches, for example. The touch panel 165 detects a position designated by the user in a display surface of the display unit 161. In the case where operating the MFP 100, the user is likely to be in an upright attitude, so that the display surface of the display unit 161, an operation surface of the touch panel 165 and the hard key unit 167 are arranged to face upward. This is for the purpose of enabling the user to easily view the display surface of the display unit 161 and easily give an instruction on the operation unit 163 with his or her finger.

Figure 4:
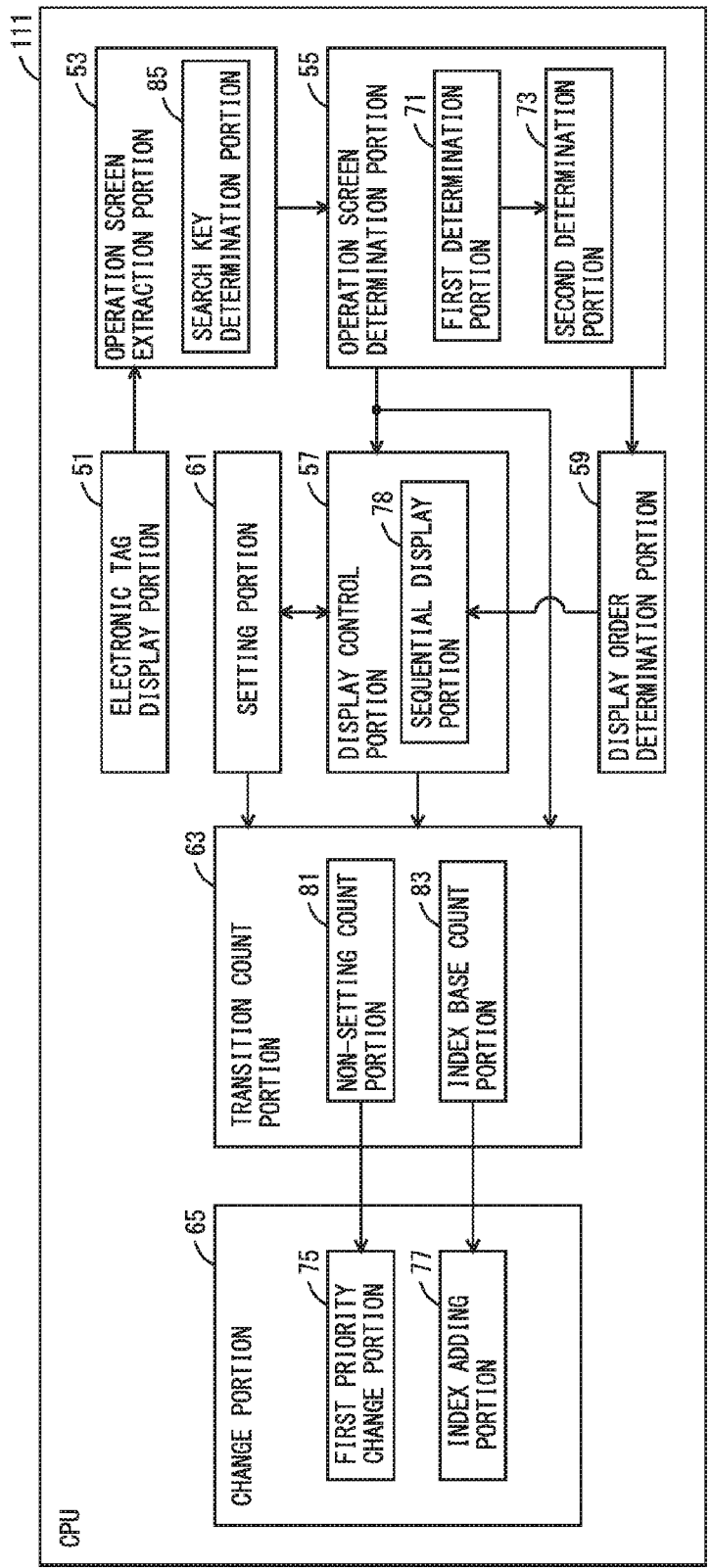
FIG. 4 is a block diagram showing one example of a function of a CPU included in the MFP.

FIG. 4 is a block diagram showing one example of functions of the CPU included in the MFP. The functions shown in FIG. 4 are functions formed in the CPU 111 by execution of an operation assistance program stored in the ROM 113, the HDD 115 or the CD-ROM 118 by the CPU 111 included in the MFP 100. Referring to FIG. 4, the CPU 111 included in the MFP 100 includes an electronic tag display portion 51, an operation screen extraction portion 53, an operation screen determination portion 55 and a display control portion 57 that controls the display unit 161, a display order determination portion 59, a setting portion 61 that sets a setting value designated by the user, a transition count portion 63, and a change portion 65.

The display control portion 57 controls the display unit 161 and displays one operation screen among a plurality of operation screens stored in the HDD 115 in the display unit 161. The plurality of operation screens stored in the HDD 115 are respectively associated with another one or more operation screens and form a hierarchy structure. In order for the user to switch the displayed operation screen to another operation screen, an operation screen includes a button for inputting the instruction of switching an operation screen to the display of another operation screen, and the button is associated with the other operation screen. Hereinafter, in an operation screen, a button that accepts an operation of switching an operation screen to another operation screen associated with the operation screen is referred to as a transition button. If the user inputs an operation of designating the transition button included in the operation screen in the operation unit 163 after the display control portion 57 displays the operation screen, the display control portion 57 displays the operation screen associated with the designated transition button in the display unit 161.

Further, each of the plurality of operation screens stored in the HDD 115 corresponds to each of the plurality of functions executable by the MFP 100, and includes a setting region for displaying a setting value used for execution of the corresponding function by the MFP 100. In the case where the display control portion 57 displays any of the plurality of operation screens, the display control portion 57 displays a setting value that is set at the time point in the setting region of the displayed operation screen.

The setting portion 61 sets a setting value based on an operation of inputting in the operation unit 163 by the user in accordance with the operation screen displayed in the display unit 161. In the case where a setting value is set by the setting portion 61 with the operation screen being displayed, the display control portion 57 displays a setting value that is set by the setting portion 61 in the setting region included in the operation screen. The CPU 111 performs the function using the setting value that is set by the setting portion 61. The functions to be performed by the CPU 111 include a scan process of controlling the automatic document feeder 120 and the document scanning unit 130 and scanning a document image, an image forming process of controlling the image forming unit 140, the paper feed unit 150 and the post-processing unit 155 and forming an image on paper, a data management process of reading out or writing the data stored in the HDD 115 or the CD-ROM 118, a facsimile process of controlling the facsimile unit 116 and transmitting and receiving facsimile data, and a data transmission reception process of controlling the communication I/F unit 112 and transmitting and receiving data. Further, the functions performed by the CPU 111 includes a combined process of two or more processes among the above-mentioned processes. For example, a copy process that is a combination of the scan process and the image forming process, a scan-to-transmission process, which is a combination of the scan process and the data transmission process, of transmitting image data of the scanned document image, and a scan-to-BOX process, which is a combination of the scan process and the data management process, of storing the image data of the scanned document image in the HDD 115.

The electronic tag display portion 51 controls the display unit 161 and displays an electronic tag stored in the HDD in advance in the display unit 161. In the case where a plurality of electronic tags are stored in the HDD 115, the electronic tag display portion 51 displays the plurality of electronic tags in the display unit 161. An electronic tag is sometimes associated with any of a plurality of operation screens. In this case, in response to display of the operation screen in the display unit 161 by the display control portion 57, the electronic tag display portion 51 displays the electronic tag associated with the operation screen in the display unit 161. Further, in the case where a plurality of electronic tags are associated with the operation screen displayed in the display unit 161, the electronic tag display portion 51 displays all of the plurality of electronic tags associated with the operation screen displayed in the display unit 161.

An electronic tag includes a character string. In the case where displaying an electronic tag in the display unit 161, the electronic tag display portion 51 displays the image of the character string included in the electronic tag in the display unit 161. In the case where an operation screen is displayed in the display unit 161 by the display control portion 57, the electronic tag display portion 51 displays the image of the character string included in the electronic tag in the operation screen in a superimposed manner. The format for the display of the character string may be defined for the electronic tag. The format includes a font and a size of a character string, and a color of the character string and a background, for example. In the case where the format is defined for the electronic tag, the electronic tag display portion 51 produces the image of the character string in accordance with the format, and displays the image of the produced character string.

The operation screen extraction portion 53 extracts one or more operation screens from among the plurality of operation screens stored in the HDD 115 using screen information. The screen information includes a search table that respectively associates one or more search indexes and first priorities with the plurality of respective operation screens stored in the HDD 115, and a priority table that respectively defines second priorities for the plurality of operation screens. The search table includes one search record for a set of one operation screen and one search index. The priority table includes one priority record for one operation screen.

FIG. 5 is a diagram showing one example of the format of the search table. Referring to FIG. 5, the search table includes a field for an operation screen, a field for a search index, and a field for a first priority. In the field for the operation screen, screen identification information for identifying an operation screen is set. In the field for the search index, a search index associated with an operation screen is set. The search index is a character string, and is used as an index when the search table is searched by a search key, described below. In the field for the first priority, the first priority associated with the operation screen specified by the screen identification information that is set in the field for the operation screen is set for the search index that is set in the field for the search index. The first priority that is set in the field for the first priority is different from the first priority that is set in the field for the first priority of another search record in which the same search index is set in the field for the search index. In other words, in the case where the same search index is associated with a plurality of operation screens, first priorities respectively supplied to the plurality of operation screens with which the same search index is associated are different from one another.

FIG. 6 is a diagram showing one example of the format of the priority table. Referring to FIG. 6, the priority table includes a field for an operation screen and a field for a second priority. In the field for the operation screen, screen identification information for identifying an operation screen is set. In the field for the second priority, a second priority supplied to the operation screen specified by the screen identification information that is set in the field for the operation screen is set. The second priority that is set in the field for the second priority is different from the second priority that is set for another priority record. In other words, second priorities supplied to a plurality of operation screens are different from one another.

Returning to FIG. 4, in response to designation of the electronic tag displayed in the display unit 161 by the user, the operation screen extraction portion 53 extracts one or more operation screens from among the plurality of operation screens stored in the HDD 115 using screen information. The operation screen extraction portion 53 includes a search key determination portion 85. The search key determination portion 85 extracts at least part of the character string included in the electronic tag designated by the user, and determines the extracted character string as a search key. The search key determination portion 85 sometimes determines two or more search keys from one electronic tag. The operation screen extraction portion 53 searches the search table using the search key determined by the search key determination portion 85. Specifically, the operation screen extraction portion 53 extracts all of the search records in which the same character string as the search key or the search index including the same character string as the search key is set in the field for the search index. The operation screen extraction portion 53 outputs a set of the search key and one or more extracted search records to the operation screen determination portion 55.

In the case where a plurality of search keys are determined by the search key determination portion 85, the operation screen extraction portion 53 extracts one or more operation screens for every plurality of search keys. The operation screen extraction portion 53 outputs a set of a search key and one or more extracted search records to the operation screen determination portion 55 for every plurality of search keys. In other words, the operation screen extraction portion 53 outputs corresponding number of the search keys of sets of the search key and the one or more extracted search records to the operation screen determination portion 55.

In response to input of the one or more sets of the search key and the one or more search records from the operation screen extraction portion 53, the operation screen determination portion 55 determines one operation screen. The operation screen determination portion 55 includes a first determination portion 71 and a second determination portion 73.

The first determination portion 71 determines one operation screen for one search key. One operation screen is determined for every one or more sets that are input from the operation screen extraction portion 53. One set includes a search key and one or more search records. In the case where the set that is input from the operation screen extraction portion 53 includes one search record, the first determination portion 71 determines the operation screen specified by screen identification information that is set in the field for the operation screen of the search record for the search key.

In the case where the set that is input from the operation screen extraction portion 53 includes two or more search records, the two or more search records are search records in which the same character string as the search key or a search index including the same character string as the search key is set in the field for the search index. Therefore, the two or more search records included in the same set include the same search index, and the search index is commonly associated with two or more operation screens and includes the character string of the search key. The first determination portion 71 determines the operation screen having the highest first priority among two or more operation screens extracted for the search key. Specifically, the first determination portion 71 extracts the search record having the highest first priority that is set in the field for the first priority from among the search records included in the set for every one or more sets. The first determination portion 71 determines an operation screen specified by screen identification information that is set in the field for the operation screen of the search record having the highest first priority as the operation screen in which the first priority is set to the highest value for the search key. Further, the first determination portion 71 preferably determines the operation screen having the highest priority from among operation screens that are the two or more operation screens extracted for the search key and the one or more operation screens in which a corresponding setting value has not been changed from a default setting value. This is for the purpose of preventing the operation screen for setting a setting value which has already been set by the operation of the user from being displayed. This is because it is unlikely for the user to reset in the operation screen in which the setting value has been set.

The first determination portion 71 determines one operation screen for every one or more sets. Therefore, in the case where there is one search key, the first determination portion 71 determines one operation screen. In the case where there are a plurality of search keys, the first determination portion 71 determines the corresponding number of the search keys of operation screens. A search record defines a first priority for a set of a search key and an operation screen, so that the same operation screen may be determined for a plurality of different search keys.

In the case where a set of a search key and one or more search records is input from the operation screen extraction portion 53, in other words, in the case where one search key is extracted from an electronic tag by the search key determination portion 85, the first determination portion 71 determines the operation screen in which a first priority is set to the highest value as a first operation screen, and outputs a set of screen identification information of the first operation screen and the search key to the display control portion 57 and the transition count portion 63. Further, the first determination portion 71 outputs one or more search records that are input together with the search key from the operation screen extraction portion 53 to the display order determination portion 59.

In the case where a plurality of sets of a search key and one or more search records are input from the operation screen extraction portion 53, in other words, in the case where a plurality of search keys are extracted from an electronic tag by the search key determination portion 85, the first determination portion 71 determines the operation screen having the highest first priority for every plurality of search keys, thereby outputting the set of the screen identification information of the operation screen having the highest first priority and the search key corresponding to the operation screen to the second determination portion 73 for every plurality of search keys.

In response to the corresponding number of the plurality of search keys of the input of the set of the screen identification information of the operation screen having the highest first priority and the search key from the first determination portion 71, the second determination portion 73 refers to the priority table recorded in the HDD 115 and determines second priorities for the plurality of operation screens respectively specified by the plurality of screen identification information, and respectively determines the operation screen having the highest second priority as a first operation screen. In other words, in the case where the operation screen having the highest first priority is determined by the first determination portion 71 for every plurality of search keys, the second determination portion 73 determines the operation screen having the highest second priority from among the corresponding number of the search keys of the operation screens as a first operation screen. The second determination portion 71 outputs the set of the screen identification information of the first operation screen and the search key to the display control portion 57 and the transition count portion 63. Further, the second determination portion 73 outputs the plurality of screen identification information that is input from the first determination portion 71 and second priorities respectively determined for the plurality of operation screens respectively specified by the plurality of screen identification information to the display order determination portion 59.

In the case where one search key is extracted from an electronic tag by the search key determination portion 85, the display order determination portion 59 receives one or more search records from the first determination portion 71. The display order determination portion 59 refers to one or more search records, determines the display order of one or more operation screens respectively specified by the one or more search records in ascending order of the first priority, and outputs screen identification information and the display order of the one or more operation screens to the display control portion 57.

In the case where a plurality of search keys are extracted from an electronic tag by the search key determination portion 85, the display order determination portion 59 receives a plurality of screen identification information and second priorities from the second determination portion 73. The display order determination portion 59 determines the display order of the plurality of operation screens respectively specified by the plurality of screen identification information in ascending order of the second priority, and outputs the plurality of screen identification information and the display order to the display control portion 57.

In response to input of a set of screen identification information of the first operation screen and a search key from any of the first determination portion 71 and the second determination portion 73, the display control portion 57 displays the first operation screen in the display unit 161. Therefore, the first operation screen is an operation screen firstly displayed after an operation of designating an electronic tag by the user is accepted. Therefore, the first operation screen is the operation screen most strongly associated by the screen information with the character string included in the electronic tag designated by the user. The display control portion 57 outputs a set of screen identification information of the first operation screen and a search key to the transition count portion 63.

In the case where receiving a set of screen identification information of the first operation screen and the search key from the first determination portion 71 or the second determination portion 73, the display control portion 57 receives one or more screen identification information and the display order from the display order determination portion 59. The display control portion 57 includes a sequential display portion 78. The sequential display portion 78 switches an operation screen displayed in the display unit 161 to another operation screen in accordance with the display order every time receiving a switching operation without setting of a setting value by the setting portion 61. While the switching operation is not limited, it is an operation of designating a predetermined hard key among the plurality of hard keys included in the hard key unit 167 of the operation unit 163.

Specifically, in the case where receiving a switching operation without setting of a setting value by the setting portion 61 after a first operation screen is displayed in the display unit 161 in response to input of screen identification information from any of the first determination portion 71 and the second determination portion 73, the sequential display portion 78 displays the operation screen next in the display order in the display unit 161. Further, in the case where accepting a switching operation without setting of a setting value by the setting portion 61 for the operation screen after switching the operation screen in the display portion 161 to another operation screen, the sequential display portion 78 displays the operation screen that comes after the next operation screen in the display order in the display unit 161. In the case where a setting value is set by the setting portion 61 for the operation screen after the sequential display portion 78 switches the operation screen displayed in the display portion 161 to another operation screen, the order display unit 78 does not display the operation screen next in the display order in the display unit 161 even if accepting a switching operation afterwards. Hereinafter, an operation screen in which a setting value is firstly set after a first operation screen is displayed in the display unit 161 is referred to as a second operation screen. The second operation screen is an operation screen to be displayed after the first operation screen, and is sometimes an operation screen displayed next after the first operation screen, or sometimes an operation screen displayed more than two operation screens after the first operation screen.

The transition count portion 63 receives a set of screen identification information of the first operation screen and a search key from the first determination portion 71 or the second determination portion 73. The transition count portion 63 includes a non-setting count portion 81 and an index base count portion 83. The non-setting count portion 81 counts the number of times of display of other operation screens in the display unit 161 without setting of a setting value after the first operation screen is displayed in the display unit 161 by the display control portion 57 as a first transition time for every first operation screen and search key. Specifically, in the case where another operation screen is displayed in the display unit 161 without setting of a setting value after the first operation screen is displayed in the display unit 161 by the display control portion 57, the non-setting count portion 81 updates a first transition count table stored in the HDD 115.

In the case where another operation screen is displayed in the display unit 161 without setting of a setting value after the first operation screen is displayed in the display unit 161 by the display control portion 57, and also a setting value is set in the other operation screen, the index base count portion 83 determines the operation screen in which a setting value is firstly set as a second operation screen. The second operation screen is sometimes an operation screen displayed two or more operation screens after the first operation screen in addition to an operation screen displayed next after the first operation screen. In the case where determining a second operation screen, the index base count portion 83 counts the number of times of setting of a setting value in the second operation screen for a search key as a second transition time. The second transition time indicates the number of times of setting of a setting value in the second operation screen without setting of a setting value in the first operation screen determined based on the search key. In the case where determining a second operation screen after receiving a set of screen identification information of a first operation screen and a search key from the first determination portion 71 or the second determination portion 73, the index base count portion 83 updates a second transition time count table stored in the HDD 115. The second transition count table associates a search key, a second operation screen and a second transition time with one another.

FIG. 7 is a diagram showing one example of a format of the first transition count table. Referring to FIG. 7, the first transition count table includes one first count record for every set of an operation screen and a search key. The first transition count table includes a field for a first operation screen, a field for a search key, and a field for a first transition time. Screen identification information of an operation screen is set in the field for the first operation screen. Any one of search indexes that are set in the field for the search index of the search table is set in the field for the search key. In the case where an operation screen specified by screen identification information that is set in the field for the first operation screen is determined as a first operation screen by the search key that is set in the field for the search key, the number of times the first operation screen is transitioned to another operation screen without setting of a setting value after the first operation is displayed is set in the field for the first transition time.

FIG. 8 is a diagram showing one example of a format of the second transition count table. Referring to FIG. 8, the second transition count table includes one second count record for every set of a second operation screen and a search key. The second transition count table includes a field for a second operation screen, a field for a search key and a field for a second transition time. Screen identification information of a second operation screen is set in the field for the second operation screen. A search key is set in the field for the search key. In the field for the second transition time, the number of times a setting value is set in the second operation screen specified by the screen identification information that is set in the field for the second operation screen without setting of a setting value in the first operation screen determined based on the search key that is set in the field for the search key is indicated.

Returning to FIG. 4, when the first transition time is not less than a predetermined value, the non-setting count portion 81 outputs a priority change instruction including a set of screen identification information of the operation screen of which the first transition time is not less than the predetermined value and a search key to the change portion 65. Specifically, the non-setting count portion 81 extracts a first count record in which the first transition time is not less than the predetermined value by updating the first transition count table, and outputs a priority change instruction including a set of screen identification information included in the extracted first count record and a search key to the change portion 65. The predetermined value is a value determined in advance, and a value for preventing an operational error by the user.

When the second transition time is not less than a predetermined value, the index base count portion 83 outputs a search key addition instruction including a set of screen identification information of the operation screen of which the second transition number time is not less than the predetermined value and a search key to the change portion 65. Specifically, the index base count portion 83 extracts a second count record in which the second transition time is not less than the predetermined value by updating the second transition count table, and outputs a search key addition instruction including a set of screen identification information included in the extracted second count record and a search key to the change portion 65.

The change portion 65 sometimes receives a priority change instruction from the non-setting count portion 81, or receives a search key addition instruction from the index base count portion 83. The change portion 65 includes a first priority change portion 75 and an index adding portion 77. In response to input of a priority change instruction, the first priority change portion 75 reduces a first priority supplied to the set of the operation screen specified by the screen identification information included in the priority change instruction and the search key included in the priority change instruction. Specifically, the first priority change portion 75 changes the first priority that is set in the field for the first priority of the search record, which is included the search table stored in the HDD 155 and in which the screen identification information included in the priority change instruction is set in the field for the operation screen and the search key included in the priority change instruction is set in the field for the search index, to a lower value. Thus, the same operation screen can be prevented from being firstly displayed in the case where the same search key is used for searching.

In response to input of a search key addition instruction, the index adding portion 77 adds a search key included in the search key addition instruction to the operation screen specified by the screen identification information included in the search key addition instruction. Specifically, the index adding portion 77 sets the screen identification information included in the search key addition instruction in the field for the operation screen, produces a new search record in which the search key included in the search key addition instruction is set in the field for the search index, and adds the produced search record to the search table stored in the HDD 115. While a first priority that is set in the field for the first priority of the newly produced search record can be arbitrarily defined, the highest first priority is preferably set.

Figure 9B:
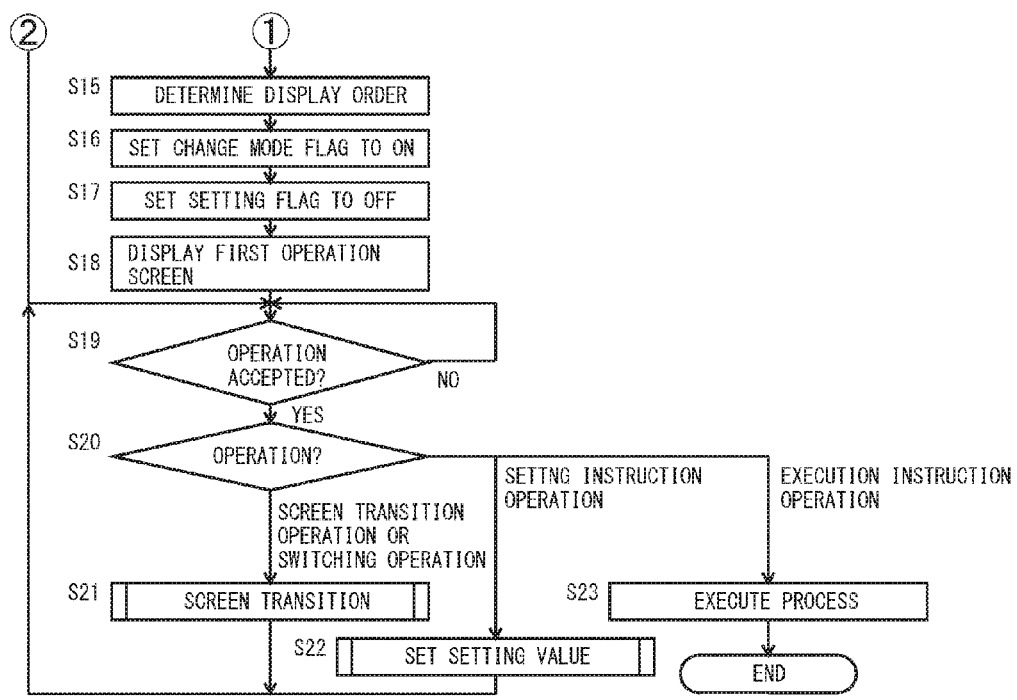
FIG. 9B is a flow chart showing one example of the flow of the operation assistance process.

FIGS. 9A and 9B are flow charts showing one example of a flow of an operation assistance operation. The operation assistance process is a process performed by the CPU 111 by execution of an operation assistance program stored in the ROM 113, the HDD 115 or the CD-ROM 118 by the CPU 111 included in the MFP 100. Referring to FIG. 9A, the CPU 111 included in the MFP 100 displays an operation screen in the display unit 161 (Step S01). The operation screen firstly displayed after execution of the operation assistance program is a predetermined operation screen. In the next step S02, an electronic tag associated with the displayed operation screen is displayed in the display unit 161. Then, a change mode flag is set to OFF (Step S03). The change mode flag is a flag indicating a period from the time when an electronic tag is designated to the time when a setting value is set. The change mode flag is set to ON when the electronic tag is designated, and set to OFF when a setting value is firstly set since the designation of the electronic tag. In the next step S04, a setting flag is set to OFF, and the process proceeds to the step S05. The setting flag is a flag indicating that a setting value is set after the first operation screen is displayed. The setting flag is set to OFF when the change mode flag is set to ON, and is set to ON when a setting value is set during a period in which the change mode flag is set to ON.

In the next step S05, whether an electronic tag has been designated is determined. If the operation unit 163 has accepted an operation of designating an electronic tag, it is determined that an electronic tag has been designated. If an electronic tag has been designated, the process proceeds to the step S06. If not, the process proceeds to the step S19.

In the step S06, a search key is determined. One or more search keys are determined from the character string included in the electronic tag designated by the user in the step S05. In the next step S07, one search key to be a target of a process is selected from among the one or more search keys determined in the step S06. In the next step S08, an operation screen is extracted using the search key. Specifically, the search table stored in the HDD 115 is searched using the search key, whereby all of the search records in which the search indexes are the same as the search key or the search indexes including the search key are set in the field for the search index are extracted.

In the next step S09, an operation screen having the highest first priority is determined. The search record having the highest first priority that is set in the field for the first priority is extracted from search records, which are the one or more search records extracted in the step S08 and the one or more search records including the screen identification information of the operation screens in which the setting values have not been changed from default values. The operation screen specified by the screen identification information that is set in the field for the operation screen of the extracted search record is determined as the operation screen having the highest first priority.

In the step S10, whether a search key that has not been selected as a target of a process is present among the one or more search keys determined in the step S06 is determined. If the unselected search key is present, the process returns to the step S07. If not, the process proceeds to the step S11. The steps S06 to S10 are performed, so that the one or more operation screens having the highest first priority are determined in response to the one or more respective search keys.

In the step S11, whether the number of search keys determined in the step S06 is plural is determined. If a plurality of search keys have been determined, the step proceeds to the step S12. If not, the process proceeds to the step S13. In the case where the process proceeds to the step S12, a plurality of operation screens respectively corresponding to the plurality of search keys are determined. In the step S12, the operation screen having the highest second priority among the plurality of operation screens respectively corresponding to the plurality of search keys is determined as a first operation screen, and the process proceeds to the step S14. Specifically, the respective second priorities of the plurality of operation screens respectively corresponding to the plurality of search keys are determined with reference to the priority table stored in the HDD 115, and an operation screen having the highest second priority is determined as a first operation screen. In other words, the operation screen having the highest second priority among the plurality of operation screens determined based on the first priorities is determined as the first operation screen for every plurality of search keys.

On the one hand, in the case where the process proceeds to the step S13, one operation screen is determined in correspondence with a single search key. In the step S13, the operation screen determined in correspondence with the search key is determined as a first operation screen, and the process proceeds to the step S14.

In the step S14, the search key corresponding to the first operation screen is temporarily stored. The search key corresponding to the first operation screen is the search key used when the first operation screen is extracted in the step S08. In the step 08, which is before the first operation screen is determined as the operation screen having the highest first priority in the step S09, the first operation screen is extracted by the search key selected in the step S07.

In the step S15, the display order is determined. In the case where the step S13 is performed, the display order is determined based on the first priorities for the one or more operation screens extracted in the step S08. On the one hand, in the case where the step S12 is performed, the steps S06 to S10 are performed, so that the plurality of operation screens having the highest first priority are determined in correspondence with the plurality of respective search keys. Therefore, the display order is determined based on the second priorities for these plurality of operation screens.

In the step S16, the change mode flag is set to ON, and the process proceeds to the step S17. In the next step S17, the setting flag is set to OFF, and the process proceeds to the step S18.

In the step S18, the first operation screen determined in the step S12 or the step S13 is displayed in the display unit 161, and the process proceeds to the step S19. In the step S19, whether an operation by the user has been accepted is determined. The process waits until the operation by the user is accepted. If the operation by the user has been accepted, the process proceeds to the step S20. In the step S20, a process branches based on the accepted operation by the user. If the operation by the user is a screen transition operation or a switching operation, the process proceeds to the step S21. If the operation by the user is a setting instruction operation, the process proceeds to the step S22. If the operation by the user is an execution instruction operation, the process proceeds to the step S23.

In the step S21, a screen transition process is performed, and the process returns to the step S19. In the step S22, a setting value setting process is performed, and the process returns to the step S19. Further, in the step S23, the process specified by the execution instruction operation is performed in accordance with the setting value that is set by the setting value setting process in the step S22, and the process ends.

Figure 10:
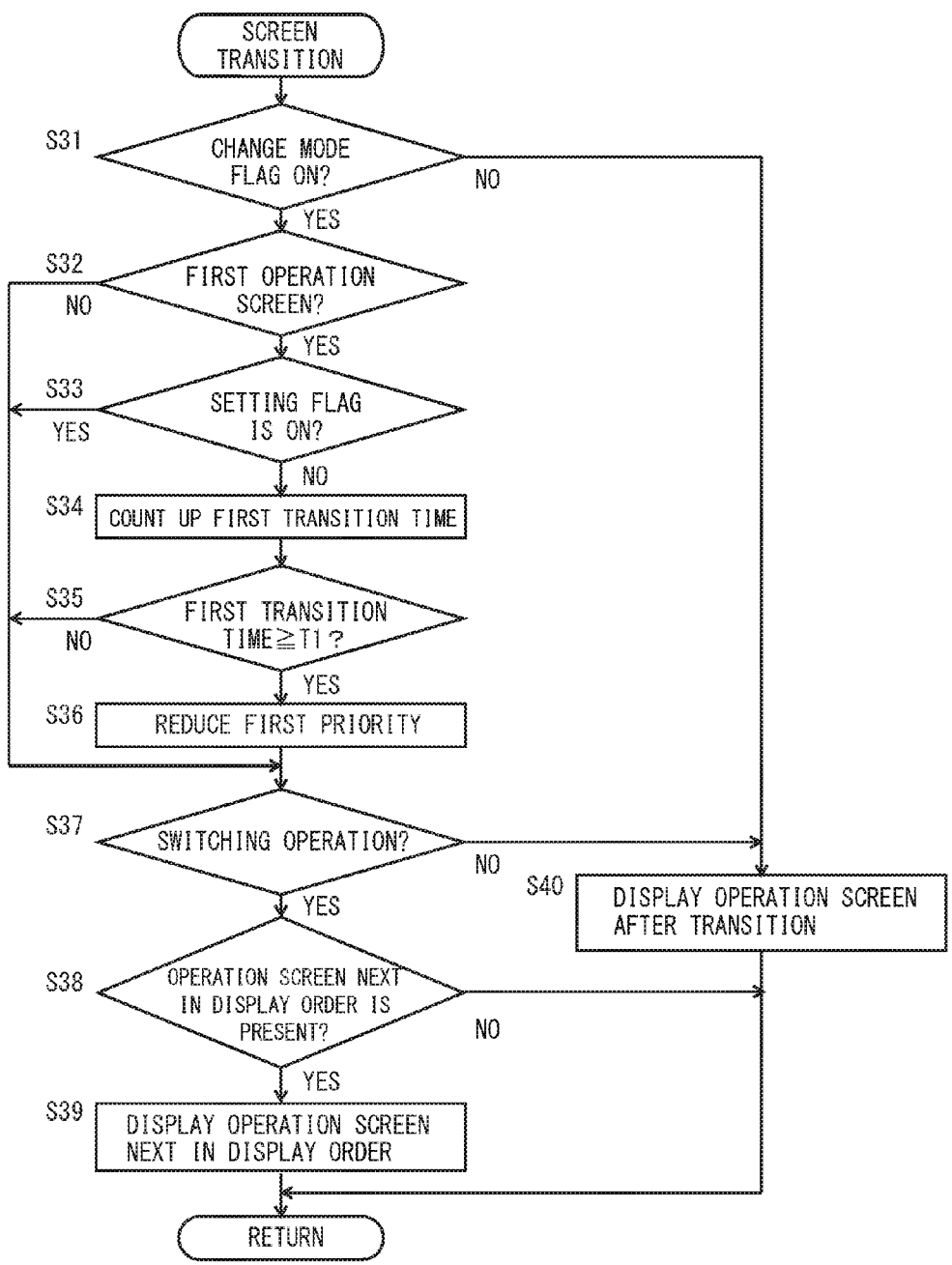
FIG. 10 is a flow chart showing one example of a flow of a screen transition process.

FIG. 10 is a flow chart showing one example of a flow of the screen transition process. The screen transition process is a process performed in the step S21 of FIG. 9B. The screen transition process is performed in the case where a screen transition operation or a switching operation by the user is accepted. The screen transition operation is accepted in the case where a transition button included in an operation screen is designated. The switching operation is accepted in the case where a predetermined hard key among the plurality of hard keys included in the hard key unit 167 of the operation unit 163 is designated.

Referring to FIG. 10, the CPU 111 determines whether the change mode flag is set to ON (Step S31). If the change mode flag is set to ON, the process proceeds to the step S32. If not, the process proceeds to the step S40.

In the step S32, whether the first operation screen is displayed in the display unit 161 is determined. If the first operation screen is displayed, the process proceeds to the step S33. If not, the process proceeds to the step S37. In the step S33, whether the setting flag is set to ON is determined. If the setting flag is set to ON, the process proceeds to the step S37. If not, the process proceeds to the step S34. The process proceeds to the step S34 in the case where the change mode flag is set to ON and the setting flag is not set to ON. In other words, it is the case where a screen transition operation or a switching operation is accepted without setting of a setting value since the first operation screen is displayed in the display unit 161. In the step S34, the first transition time of the first operation screen is counted up. Specifically, the first count record in which the screen identification information of the first operation screen is set in the field for the first operation screen and the search key temporarily stored in the step S14 of FIG. 9A is set in the field for the search key is specified from the first transition count table stored in the HDD 115, and the first transition time that is set in the field for the first transition time of the specified first count record is updated with an incremented value.

In the next step S35, whether the counted-up first transition time is not less than a threshold value T1 is determined. If the first transition time is not less than the threshold value T1, the process proceeds to the step S36. If the first transition time is less than the threshold value T1, the process proceeds to the step S37. In the step S36, the first priority of the first operation screen is reduced. Specifically, the search record in which the screen transition information of the first operation screen is set in the field for the operation screen and the search keys temporarily stored in the step S14 of the FIG. 9A are set in the field for the search index is specified from among the search table stored in the HDD 115, and the first priority that is set in the field for the first priority of the specified search record is changed to a lower value. This prevents the first operation screen from being firstly displayed by the same search key. Further, in the case where the first transition time is not less than the threshold value T1, the first priority is changed to a lower value, so that an operational error by the user can be prevented. For example, in the case where the user inputs a screen transition operation or a switching operation by mistake, the first priority can be prevented from being immediately changed.

In the step S37, whether the operation accepted in the step S20 of FIG. 9B is a switching operation is determined. If the operation is a switching operation, the process proceeds to the step S38. If not, the process proceeds to the step S40. In the case where the process proceeds to the step S38, whether the operation screen that is next in the display order determined in the step S15 of FIG. 9B is present is determined. If the operation screen that is next in the display order is present, the process proceeds to the step S39. If not, the process returns to the operation assistance process. In the step S39, the operation screen that is next in the display order is displayed in the display unit 161, and the process returns to the operation assistance process. Specifically, in the case where one search key is determined in the step S06 of FIG. 9A, one or more operation screens are extracted for the one search key by the steps S06 to S10, and the display order is determined based on the first priorities for one or more operation screens in the step S15, whereby the operation screen, which has not been displayed and is next in the display order among one or more operation screens, is displayed in the display unit 161. Further, in the case where the plurality of search keys are determined in the step S06 of FIG. 9A, the plurality of operation screens having the highest first priority are determined in correspondence with the plurality of respective search keys by the steps S06 to S10, and the display order is determined based on the second priorities for the plurality of operation screens in the step S15, whereby the operation screen, which has not been displayed and is next in the display order among the plurality of operation screens, is displayed in the display unit 161. Thus, the plurality of operation screens are sequentially displayed in accordance with the display order, so that an operation of selecting an operation screen for setting a setting value from among the plurality of operation screens becomes easy.

The process proceeds to the step S40 in the case where the operation accepted in the step S20 of FIG. 9B is a screen transition operation. In the step S40, the operation screen specified by the screen transition operation is displayed in the display unit 161, and the process returns to the operation assistance process.

Figure 11:
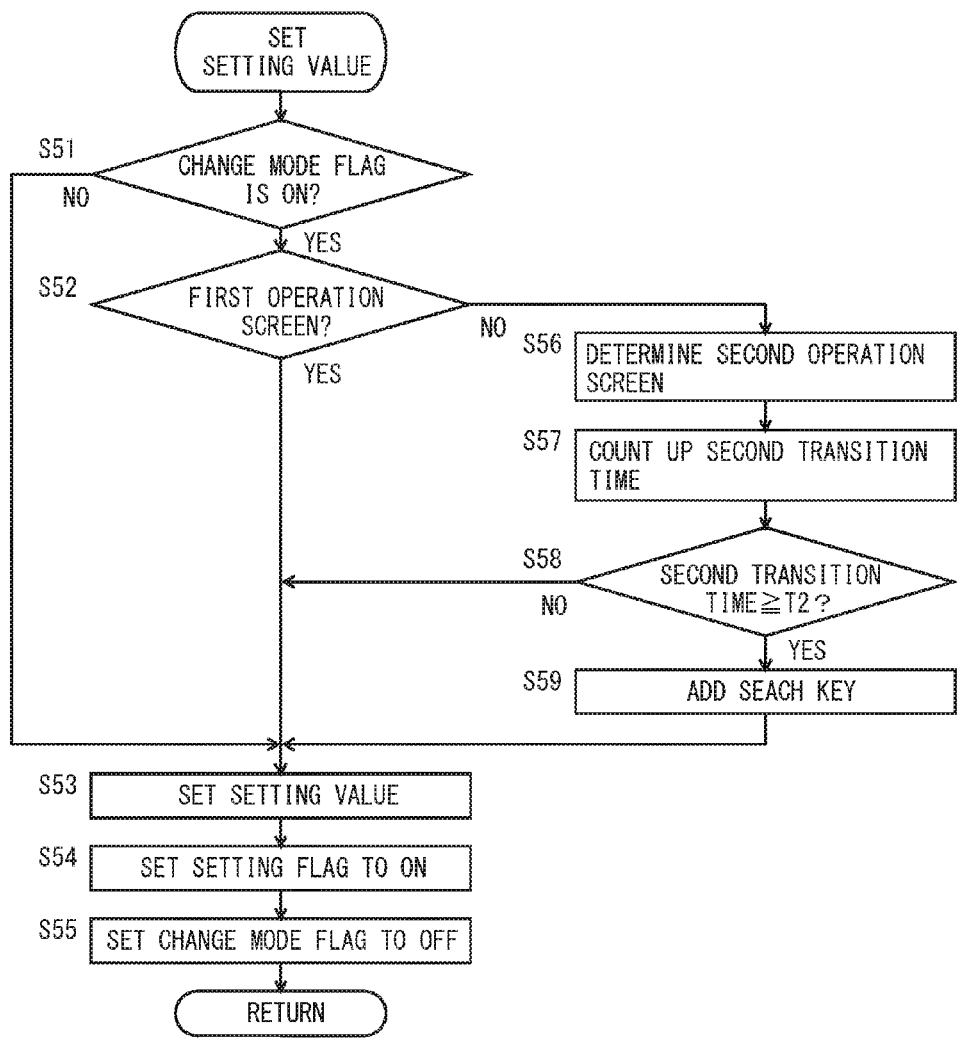
FIG. 11 is a flow chart showing one example of a flow of a setting value setting process.

FIG. 11 is a flow chart showing one example of a flow of a setting value setting process. The setting value setting process is a process performed in the step S22 of FIG. 9B. Referring to FIG. 11, the CPU 111 determines whether the change mode flag is set to ON (Step S51). If the change mode flag is set to ON, the process proceeds to the step S52. If not, the process proceeds to the step S53. The process proceeds to the step S52 in the case where a setting value has not been set since the first operation screen is displayed.

In the step S52, whether the first operation screen is displayed in the display unit 161 is determined. If the first operation screen is displayed, the process proceeds to the step S53. If not, the process proceeds to the step S56. The process proceeds to the step S56 in the case where an operation screen different from the first operation screen is displayed in the display unit 161 without setting of a setting value since the first operation screen is displayed.

In the step S56, the operation screen displayed in the display unit 161 is determined as a second operation screen. In the next step S57, the second transition time corresponding to the second operation screen is counted up. Specifically, a second count record in which the screen identification information of the second operation screen is set in the field for the second operation screen and the search key temporarily stored in the step S14 of FIG. 9A is set in the field for the search key is specified from the second transition count table stored in the HDD 115, and the second transition time that is set in the field for the second transition time of the specified second count record is updated with an incremented value.

In the next step S58, whether the counted-up second transition time is not less than a threshold value T2 is determined. If the second transition time is not less than the threshold value T2, the process proceeds to the step S59. If the second transition time is less than the threshold value T2, the process proceeds to the step S53. In the step S59, a search key is added to the search index of the second operation screen, and the process proceeds to the step S53. Specifically, screen identification information of the second operation screen is set in the field for the operation screen, the search key temporarily stored in the step S14 of FIG. 9A is set in the field for the search index, a new search record in which the highest first priority is set in the field for the first priority is produced, and the produced search record is added to the search table stored in the HDD 115. Thus, in the case where the same search key is used for searching, the second operation screen is extracted, so that the operation screen extracted for the same search key can be changed. In the case where the second transition time is not less than the threshold value T2, a search record is added, so that an operational error by the user can be prevented. For example, in the case where a setting value is input after the user performs a screen transition operation or a switching operation by mistake, the search record of the second operation screen is prevented from being immediately added.

In the case where the search record in which the screen identification information of the second operation screen is set in the field for the operation screen, and the search key temporarily stored in the step S14 of FIG. 9A is set in the field for the search index is present in the search table stored in the HDD 115, the highest first priority is set in the field for the first priority of the search record.

In the step S53, in the case where the process proceeds from the step S51, a setting value for performing the function corresponding to the operation screen displayed in the display unit 161 is set in accordance with the setting instruction operation, and the process proceeds to the step S54. In the case where the process proceeds to the step S52, a setting value for performing the function corresponding to the first operation screen is set in accordance with the setting instruction operation, and the process proceeds to the step S54. In the case where the process proceeds from the step S59, a setting value for performing the function corresponding to the second operation screen is set in accordance with the setting instruction operation, and the process proceeds to the step S54. In the step S54, the setting flag is set to ON, the change mode flag is set to OFF in the next step S55, and the process returns to the operation assistance process.

In the case where it is determined in the step S52 that the operation screen displayed in the display unit 161 is the first operation screen, the first transition time of the first operation screen may be counted down. Specifically, the first count record in which the screen identification information of the first operation screen is set in the field for the first operation screen and the search key temporarily stored in the step S14 of FIG. 9A is set in the field for the search key is specified from the first transition count table stored in the HDD 115, and the first transition time that is set in the field for the first transition time of the specified first count record is updated with a decremented value.

Figure 12:
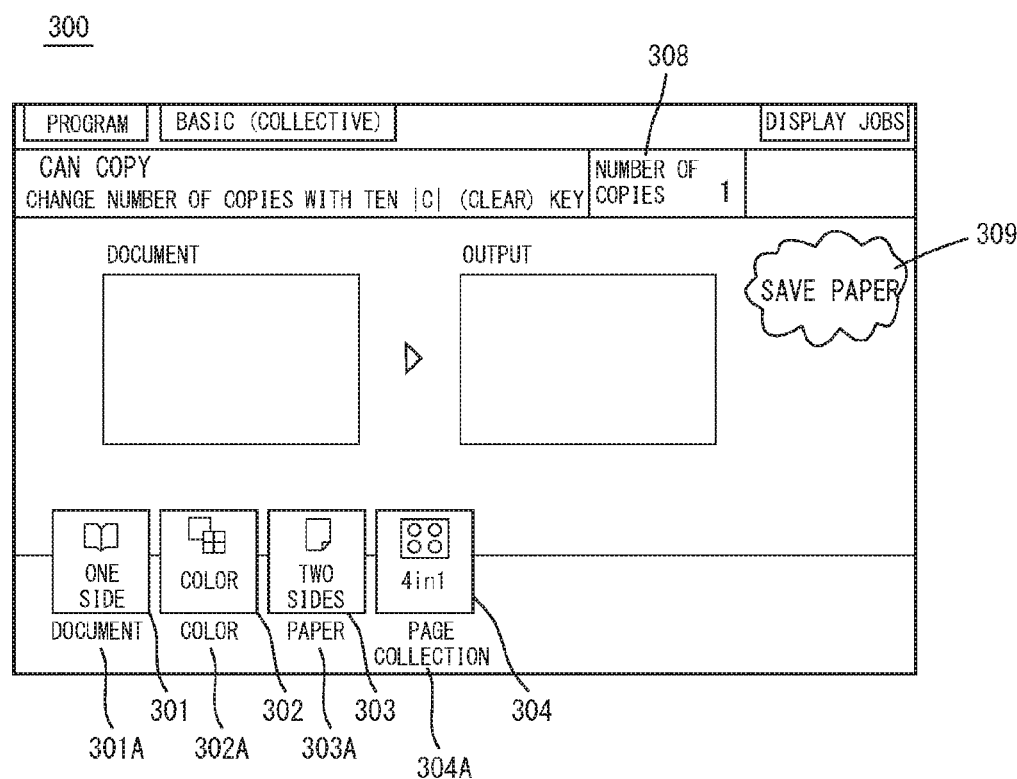
FIG. 12 is a diagram showing one example of a screen in which an electronic tag is displayed in the operation screen in a superimposed manner.

FIG. 12 is a diagram showing one example of the screen in which an electronic tag is displayed in an operation screen in a superimposed manner. Referring to FIG. 12, the electronic tag 309 is displayed in a superimposed manner in the operation screen 300. The electronic tag 309 includes an image of a character string "Save Paper".

The operation screen 300 shows one of the plurality of operation screens stored in the HDD 115, and shows the operation screen for setting a setting value of a copy process. The operation screen 300 includes a setting region 308 for displaying a setting value of the number of copies, and four transition buttons 301 to 304. A default setting value "1" is shown in a setting region 308, and the user can operate the operation unit 163 to change the setting value to another setting value.

The transition button 301 is associated with the operation screen for setting image quality of a document. A region 301A displaying screen identification information "Document" of the operation screen with which the transition button 301 is associated is arranged below the transition button 301. The transition button 302A is associated with the operation screen for setting the number of colors for image formation. A region 302A displaying screen identification information "Color" of the operation screen with which the transition button 302 is associated is arranged below the transition button 302. The transition button 303 is associated with the operation screen for setting paper and an image formation surface for forming an image. A region 303A displaying screen identification information "Paper" of the operation screen with which the transition button 303 is associated is arranged below the transition button 303. The transition button 304 is associated with the operation screen for setting the number of pages of the document to be formed on the paper. A region 306 displaying screen identification information "Page Collection" of the operation screen with which the transition button 304 is associated is arranged below the transition button 304.

FIG. 13 is a diagram showing one example of the search table. Referring to FIG. 13, in response to the four respective operation screens of the screen identification information "Page Collection", "Document", "Paper", and "Color", search indexes and the first priorities corresponding to the search indexes are defined. For example, the search index "Paper" is associated with the two operation screens of the screen identification information "Page Collection" and "Paper". The first priority for the operation screen of the screen identification information "Page Collection" is set to "2", and the first priority for the operation screen of the screen identification information "Paper" is set to "1". Further, the search index "Save" is associated with all of the four operation screens of the screen identification information "Page Collection", "Document", "Paper", and "Color". The first priority for the operation screen of the screen identification information "Page Collection" is "1", the first priority for the operation screen of the screen identification information "Document" is "2", the first priority for the operation screen of the screen identification information "Paper" is "3", the first priority for the operation screen of the screen identification information "Color" is set to "4".

FIG. 14 is a diagram showing one example of the priority table. Referring to FIG. 14, the second priority "4" is associated with the operation screen of the screen identification information "Page Collection", the second priority "3" is associated with the operation screen of the screen identification information "Document", the second priority "2" is associated with the operation screen of the screen identification information "Paper", and the second priority "1" is associated with the operation screen of the screen identification information "Color".

An operation of the MFP 100 in the case where the user designates the electronic tag including the character string "Paper" with the search table shown in FIG. 13 and the priority table shown in FIG. 14 being stored in the HDD 115 will be described. The search key composed of the character string "Paper" is determined from the character string "Paper" included in the electronic tag. The search table is searched using the search key composed of the character string "Paper", so that the operation screen of the screen identification information "Page Collection" and the operation screen of the screen identification information "Paper" are extracted. Then, the operation screen of the screen identification information "Paper" having the highest first priority for the search index "Paper" is determined as a first operation screen, and the operation screen of the screen identification information "Page Collection" is determined as the operation screen having the second place in the display order. In this case, the operation screen of the screen identification information "Paper" that is the first operation screen is firstly displayed in the display unit 161. Then, if the user performs a switching operation without setting a setting value in accordance with the operation screen of the screen identification information "Paper", the operation screen of the screen identification information "Page Collection" having the second place in the display order is displayed in the display unit 161. If the user repeats this operation a predetermined number of times or more, the first priority associated with the operation screen of the screen identification information "Paper" for the search key "Paper" is reduced. Therefore, in the case where the user designates the electronic tag including the character string "Paper" the next time, the operation screen of the screen identification information "Page Collection" is firstly displayed in the display unit 161.

Further, in the case where the user designates the electronic tag 309 including the character string "Save Paper", a search key composed of the character string of "Paper" and the search key composed of the character string of "Save" are determined from the character string "Save Paper" included in the electronic tag. Then, the search table is searched using the search key composed of the character string "Paper", whereby the operation screen of the screen identification information "Page Collection" and the operation screen of the screen identification information "Paper" are extracted. Then, the operation screen of the screen identification information "Paper" having the highest first priority for the search index "Paper" is determined as the operation screen having the highest first priority in correspondence with the search key composed of the character string of "Paper".

Next, the search table is searched using the search key composed of the character string of "Save", whereby the operation screen of the screen identification information "Page Collection", the operation screen of the screen identification information "Document", the operation screen of the screen identification information "Paper", and the operation screen of the screen identification information "Color" are extracted. Then, the operation screen of the screen identification information "Page Collection" having the highest first priority for the search index "Save" is determined as the operation screen having the highest first priority in correspondence with the search key composed of the character string "Save".

Next, the second priority of the operation screen of the screen identification information "Paper" is "2", and the second priority of the operation screen of the screen identification information "Page Collection" is "4", so that the operation screen of the screen identification information having the highest second priority is determined as a first operation screen.

In this case, in the case where the user designates the electronic tag 309 including the character string "Save Paper", the operation screen of the screen identification information "Paper" is firstly displayed in the display unit 161. Then, in the case where the user allows another operation screen such as the operation screen of the screen identification information "Color" to be displayed without setting of a setting value in accordance with the operation screen of the screen identification information "Paper" and repeats an operation of setting a setting value a predetermined number of times or more, the first priority associated with the operation screen of the screen identification information "Paper" for the search key "Paper" is reduced, and the search key "Paper" is added to the operation screen of the screen identification information "Color". Specifically, a search record in which the screen identification information "Color" is set in the field for the operation screen, "Paper" is set in the field for the search index, the highest first priority is set for the search index "Paper" in the field for the first priority is produced and added to the search table. Therefore, in the case where the user designates the electronic tag 309 including the character string "Save Paper", the operation screen of the screen identification information "Color" is firstly displayed in the display unit 161.

First Modified Example

In the above-mentioned embodiment, in the case where another operation screen is displayed in the display unit 161 without setting of a setting value since the first operation screen is displayed, the MFP 100 changes a first priority of a first operation screen. In the case where another operation screen is displayed in the display unit 161 without setting of a setting value since the first operation screen is displayed, the MFP 100 in the modified example changes a second priority of a first operation screen. Hereinafter, differences of the MFP 100 in the modified example from the MFP 100 in the first embodiment will be mainly described.

Figure 15:
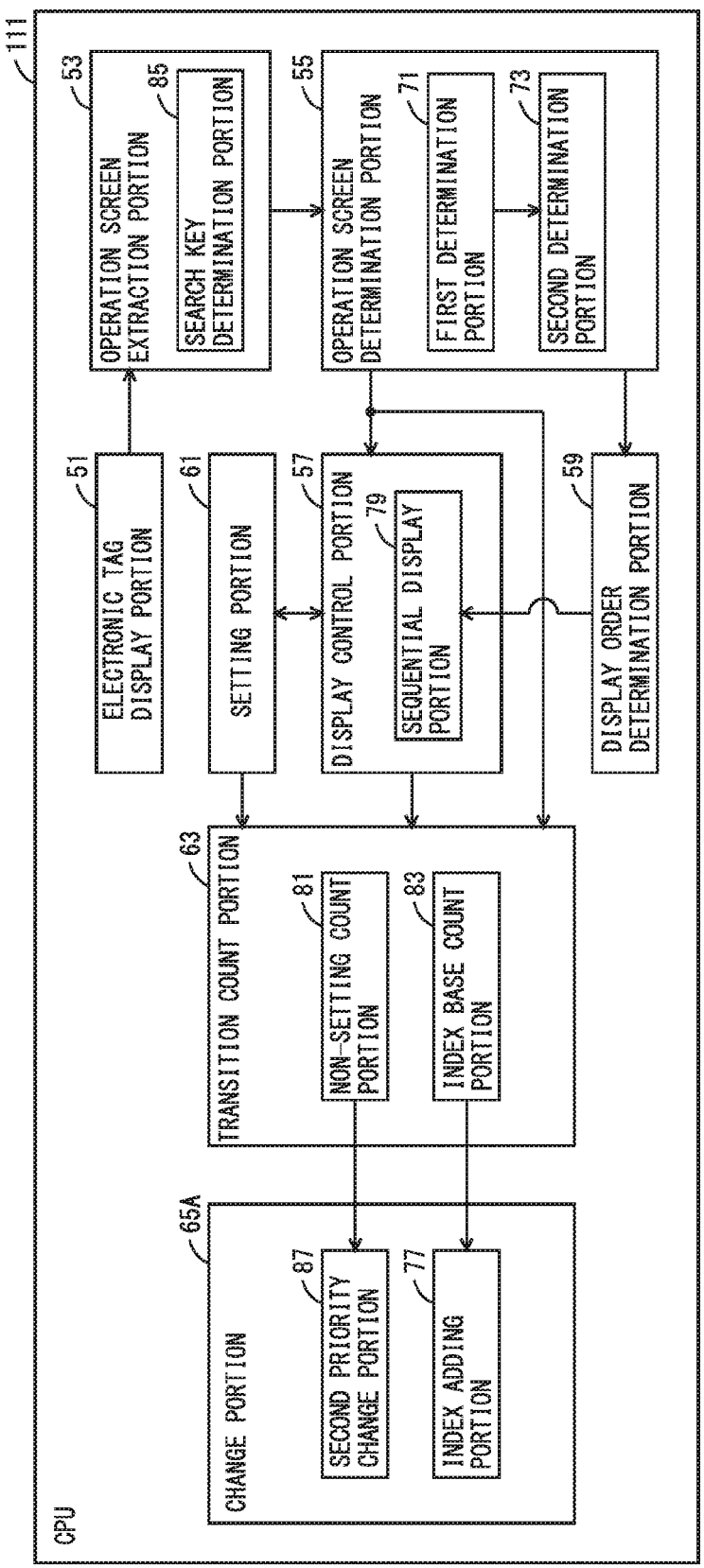
FIG. 15 is a block diagram showing one example of functions of a CPU included in an MFP in a modified example.

FIG. 15 is a block diagram showing one example of functions of the CPU included in the MFP in the modified example. Differences of the functions shown in FIG. 15 from the functions shown in FIG. 4 is that the change portion 65 is changed to a change portion 65A. Other functions are the same as the functions shown in FIG. 4. A description thereof is therefore not repeated. The change portion 65A includes a second priority change portion 87 and the index adding portion 77. The index adding portion 77 is the same as the index adding portion 77 shown in FIG. 4. The second priority change portion 87 receives a priority change instruction from the non-setting count portion 81. In response to input of the priority change instruction from the non-setting count portion 81, the second priority change portion 87 reduces the second priority supplied to the set of the operation screen specified by screen identification information included in the priority change instruction and the search key included in the priority change instruction by one. Specifically, the second priority change portion 87 changes the second priority, set in the field for the second priority of the priority record, which is included in the priority table stored in the HDD 115 and in which the screen identification information included in the priority change instruction is set in the field for the operation screen, to a lower value.

The CPU 111 included in the MFP 100 in the modified example performs the process similar to the operation assistance process shown in FIGS. 9A to 11 except for the step S36 shown in FIG. 10. The CPU 111 included in the MFP 100 in the modified example reduces the second priority of the first operation screen in the step S36. Specifically, the priority record in which the screen identification information of the first operation screen is set in the field for the operation screen is specified from the priority table recorded in the HDD 115, and the second priority that is set in the field for the second priority of the specified priority record is changed to a lower value.

An operation of the MFP 100 in the first modified example in the case where the user designates the electronic tag including the character string "Paper" with the search table shown in FIG. 13 and the priority table shown in FIG. 14 being stored in the HDD 115 will be described. In the case where the user designates the electronic tag 309 including the character string "Save Paper", the operation screen of the screen identification information "Paper" is firstly displayed in the display unit 161. Next, in the case where the user repeats an operation of allowing another operation screen to be displayed without setting of a setting value in accordance with the operation screen of the screen identification information "Paper" and setting a setting value a predetermined number of times or more, the second priority associated with the operation screen of the screen identification information "Paper" for the search key "Paper" is reduced. Thus, the second priority associated with the operation screen of the screen identification information "Paper Collection" for the search key "Paper" becomes the highest. Thus, in the case where the user designates the electronic tag 309 including the character string "Save Paper" the next time, the operation screen of the screen identification information "Page Collection" is firstly displayed in the display unit 161.

Second Modified Example

In the above-mentioned present embodiment, an example in which the first operation screen is displayed in the case where an electronic tag is designated by the user is described. However, the present invention is not limited to an electronic tag. In the case where the user inputs a character string for searching in the operation unit 161, one or more search keys may be determined from the character string for searching, and the first operation screen may be displayed. For example, it is effective in the case where the user inputs a character string for searching in order to find a desired operation screen.

Third Modified Example

For the above-mentioned MFP 100, the case where the search table, the priority table, the first transition count table, and the second transition count table are stored in the HDD 115 is described as an example. However, these search table, priority table, first transition count table and second transition count table may be stored in the HDD 115 for every user who operates the MFP 100. The user operating the MFP 100 is specified using an authentication function, for example, and a first operation screen is displayed using the search table, the priority table, the first transition count table and the second transition count table corresponding to the specified user. Thus, even in the case where there are a plurality of users using the MFP 100, the dedicated search table, priority table, first transition count table and second transition count table for each of the plurality of users are stored in the HDD 115, so that the search table, the priority table, the first transition count table, and the second transition count table are customized for every user. Therefore, even in the case where a plurality of users commonly use the MFP 100, an operation screen firstly displayed after a user using the MFP 100 designates an electronic tag can be different depending on the user.

Further, a search table, a priority table, a first transition count table, and a second transition count table for every user may be commonly used among a plurality of MFPs. For example, any one of the plurality of MFPs or the server stores the search table, the priority table, the first transition count table, and the second transition count table for every user. In this case, even in the case where the user uses any of the plurality of MFPs, the first operation screen is displayed using the same search table, priority table, first transition count table, and second transition count table. Therefore, the user can operate all of the plurality of MFPs with the same feeling, and an uncomfortable feeling towards the operation can be reduced.

For example, the case where four MFPs 100A to 100D are connected to the server in addition to the MFP 100 will be described as an example. The server registers the MFPs 100, 100A to 100D as apparatuses that use electronic tags, and stores a search table, a priority table, a first transition count table, and a second transition count table for every user. In the case where the user uses the MFP 100, the MFP 100 downloads the search table, the priority table, the first transition count table, and the second transition count table stored in the server for the user using the MFP 100 from the server. The user using the MFP 100 operates the MFP 100, so that the MFP 100 updates the search table, the priority table, the first transition count table, and the second transition count table. Thus, the MFP 100 transmits the updated search table, priority table, first transition count table and second transition count table to the server, and the search table, the priority table, the first transition count table, and the second transition count table that are updated by the MFP 100 are stored in the server. Next, in the case where the user uses any of the MFPs 100A to 100D other than the MFP 100, if the user uses the MFP 100A, for example, the MFP 100A downloads the search table, the priority table, the first transition count table, and the second transition count table that are stored in the server for the user using the MFP 100A from the server. The search table, the priority table, the first transition count table, and the second transition count table that are downloaded by the MFP 100A are the search table, the priority table, the first transition table, and the second transition count table that are updated by the MFP 100 by an operation of the MFP 100 by the user. For example, in the case where the user operates the MFP 100 and performs an operation of allowing another operation screen to be displayed in the display unit 161 without setting a setting value since the first operation screen is displayed, the first priority of the first operation screen is changed by the MFP 100. However, in the case where the user operates the MFP 100A the next time, the MFP 100A uses the first priority that is changed by the MFP 100 as the first priority of the first operation screen.

In this manner, in the case where the user operates the MFP 100A, the search table, the priority table, the first transition count table, and the second transition count table that are updated by the MFP 100 are used by an operation of the MFP 100. Therefore, operations performed in the MFP 100 can be reflected to the search table, the priority table, the first transition count table, and the second transition count table utilized by the MFP 100A.

Instead of the search table, the priority table, the first transition count table, and the second transition count table being stored for every user, a search table, a priority table, a first transition count table, and a second transition count table that are commonly used among the plurality of MFPs 100, 100A to 100D may be stored in the server.

Fourth Modified Example

The search table stored in the HDD 115 may be commonly used with a plurality of MFPs. In this case, the MFP 100 acquires the search table stored in another MFP 100A from the MFP 100A, and couples the search table acquired from the other MFP 100A to the search table stored in the HDD 115. In this case, the first priority defined in the search table stored in the HDD 115 is prioritized. Specifically, among the search records included in the search table acquired from the other MFP 100A, only a search record in which a set of screen identification information and a search key is different from the search record included in the search table stored in the HDD 115 is added to the search table stored in the HDD 115. Thus, it is not necessary to newly add a search key to the search table.

For example, the case where the four MFPs 100A to 100D are connected to the server in addition to the MFP 100 will be described as an example. The server registers the MFPs 100, 100A to 100D as apparatuses that uses electronic tags, and stores a search table. In the case where the user uses the MFP 100, the MFP 100 downloads the search table stored in the server from the server. The user using the MFP 100 operates the MFP 100, so that the MFP 100 updates the search table. Therefore, the MFP 100 transmits the updated search table to the server, and stores the search table updated by the MFP 100 in the server. Then, in the case where the user uses any of the MFPs 100A to 100D other than MFP 100, if the user uses the MFP 100A, for example, the MFP 100A downloads the search table stored in the server from the server. The search table downloaded by the MFP 100A is the search table updated by the MFP 100 by an operation of the MFP 100 by the user. For example, in the case where the user operates the MFP 100 and the search record is newly added, if the user operates the MFP 100A the next time, the MFP 100A uses the newly added search record added by the MFP 100.

In this manner, in the case where the user operates the MFP 100A, the search table that is updated by the MFP 100 by an operation of the MFP 100 is used, so that the operation performed in the MFP 100 can be reflected to the search table utilized by the MFP 100A.

As described above, the MFP 100 in the present embodiment functions as an image processing apparatus, searches screen information using at least part of a search key of a character string included in an electronic tag, extracts one or more operation screens, and changes the screen information based on the accepted operation of the user after the determined operation screen from among the one or more extracted operation screens is displayed. Therefore, the screen information is changed based on the operation by the user, so that the operation screen displayed for the search key can be changed in correspondence with an operation of the user.

Further, the screen information associates two or more operation screens associated with the same search index to the first priority. The MFP 100 determines the operation screen having the highest first priority among the two or more operation screens extracted by searching using a search key, thereby being able to determine one operation screen for the search key. Further, the MFP 100 determines the operation screen having the highest first priority from among the operation screens, which are two or more operation screens extracted by a search using a search key and one or more operation screens in which the setting value defined in correspondence with the operation screen has not been changed from a default value, as the first operation screen. The MFP 100 does not determine the operation screen in which the setting value has been changed from the default value as a first operation screen, so that an operation screen for setting a setting value that has already been set by an operation by the user can be prevented from being displayed.

In the case where the number of times of the occurrence of the event in which another second operation screen is displayed without setting of a setting value defined for a first operation screen after the first operation screen is displayed is not less than a threshold value T1, the MFP 100 changes the first priority associated with the first operation screen for the search index, which is associated with the first operation screen and includes the search key, to a lower value. Therefore, in the case where the same search key is used for searching, the same operation screen can be prevented from being firstly displayed. The first priority is changed in the case where the number of times of the occurrence of the event is not less than the threshold value T1, whereby the first operation screen can be prevented from not being firstly displayed by an operational error by the user.

Further, in response to designation of an electronic tag, the MFP 100 sets at least part of the character string included in the electronic tag as a search key for searching, and displays a first operation screen, so that the user can display the first operation screen by a simple operation of designating the electronic tag.

Further, in the case where determining two or more search keys from the character string included in the electronic tag, the MFP 100 determines the operation screen having the highest second priority among the two or more operation screens determined based on the first priority respectively corresponding to the search keys as a first operation screen, whereby one operation screen can be determined for the plurality of search keys.

Further, in the case where another operation screen is displayed without setting of a setting value after a first operation screen is displayed, if the number of times of the occurrence of the event in which a setting value is set in a second operation screen is not less than a threshold value T2, the MFP 100 adds a search index including a search key to the screen information of the second operation screen. Therefore, in the case where the same search key is used for searching the next time, the second operation screen is extracted, so that the operation screen extracted for the same research key can be changed. Further, the threshold value T2 is used, so that a search index can be prevented from being added to the second operation screen by an operational error by the user.

Further, in the case where extracting two or more operation screens using one search key, the MFP 100 determines the display order of the two or more operation screens and displays two or more operation screens in ascending order of the display order. Therefore, an operation of selecting an operation screen for setting a setting value from among the plurality of operation screens stored in the HDD 115 can be easily performed.

Further, in the case where the number of times of the occurrence of the event in which another operation screen is displayed without setting of a setting value after the operation screen having the highest second priority is displayed is not less than the threshold value T1, the MFP 100 in the first modified example changes the second priority associated with the operation screen having the highest second priority to a lower value. Therefore, in the case where an electronic tag is designated the next time, the same operation screen can be prevented from being firstly displayed. Further, the threshold value T1 is used, so that the operation screen having the highest second priority can be prevented from not being firstly displayed due to an operational error by the user.

In the above-mentioned embodiment, the MFP 100 is described as one example of an image processing apparatus. However, it is needless to say that the present invention can be understood as an operation assistance method for allowing the MFP 100 to perform an operation assistance process shown in FIGS. 9A to 11 and an operation assistance program for allowing the CPU 111 that controls the MFP 100 to perform the operation assistance method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a display that displays an image;
an operation panel; and
a processor, wherein
the processor includes
a display control portion configured to display any one of a plurality of operation screens in the display,
a setting portion configured to control the operation panel, accept a setting value defined for the displayed operation screen, and set the accepted setting value,
an operation screen extraction portion configured to search, using a search key, screen information being provided separately from the plurality of operation screens and respectively associating one or more search indexes with one or more operation screens among the plurality of operation screens and extract one or more operation screens among the plurality of operation screens,
an operation screen determination portion configured to determine one operation screen from among the one or more extracted operation screens, and
a change portion configured to change the screen information based on an operation of a user accepted by the operation panel after the determined operation screen is displayed in the display,
wherein the screen information associates, in the case where a same search index is associated with two or more operation screens among the plurality of operation screens, first priorities with the two or more operation screens associated with the same search index,
wherein the operation screen determination portion includes a first determination portion configured to, in the case where the two or more operation screens are extracted by a search using the search key by the operation screen extraction portion, determine an operation screen having a highest first priority among the first priorities respectively associated with the two or more extracted operation screens for every search index, which is commonly associated with the two or more extracted operation screens and includes the search key, among the two or more extracted operation screens,
and the image processing apparatus further comprising a first priority change portion configured to, in the case where the two or more operation screens are extracted by the search using the search key by the operation screen extraction portion, a first operation screen determined from among the two or more operation screens by the first determination portion being displayed in the display, and then another second operation screen being displayed without setting of a setting value defined for the first operation screen, change the first priority associated with the first operation screen for a search index, which is associated with the first operation screen and includes the search key, to a lower value.

2. The image processing apparatus according to claim 1, wherein
the first determination portion is configured to determine an operation screen having the highest first priority from among one or more operation screens, which are the two or more operation screens extracted by the operation screen extraction portion and in which a corresponding defined setting value has not been changed from a default value.

3. The image processing apparatus according to claim 1, wherein
the first priority change portion is configured to, on condition that an event in which the second operation screen is displayed without setting of the setting value by the setting portion after the first operation screen determined by the first determine portion is displayed occurs a predetermined number of times or more, change the first priority to a lower value.

4. The image processing apparatus according to claim 1, wherein
the processor further includes a character string display portion configured to display an image of a character string in a superimposed manner in the displayed operation screen in the display such that the image of the character string can be designated, and
the operation screen extraction portion is configured to, in response to designation of the image of the character string, set at least part of the character string as the search key for searching.

5. The image processing apparatus according to claim 4, wherein
the screen information associates the plurality of operation screen with second priorities, and
the operation screen determination portion includes a second determination portion configured to, in the case where an operation screen is determined by the first determination portion in correspondence with two or more respective search keys included in the character string, determine an operation screen having the highest second priority among the two or more determined operation screens.

6. The image processing apparatus according to claim 5, wherein
the processor further includes a second priority change portion configured to, in the case where, without setting of a setting value by the setting portion after a third operation screen determined by the second determination portion is displayed, another fourth operation screen is displayed, change the second priority associated with the third operation screen to a lower value.

7. The image processing apparatus according to claim 6, wherein
the second priority change portion is configured to, on condition that an event in which, without setting of a setting value by the setting portion after a third operation screen determined by the second determination portion is displayed, the fourth operation screen is displayed occurs a predetermined number of times or more, change the second priority to a lower value.

8. The image processing apparatus according to claim 1, wherein
the processor further includes an index adding portion configured to, in the case where the two or more operation screens are extracted by a search using the search key by the operation screen extraction portion, an operation screen determined by the screen determination portion is displayed, and then another operation screen is displayed without setting of a setting value by the setting portion, add a search index, which is associated with the operation screen determined by the screen determination portion and includes the search key, to screen information of an operation screen, which is displayed after the operation screen determined by the screen determination portion and in which a setting value is firstly set by the setting portion.

9. The image processing apparatus according to claim 8, wherein
the index adding portion is configured to, on condition that an event in which the setting value is not set by the setting portion after the operation screen determined by the operation screen determination portion is displayed in the display, and a setting value corresponding to the operation screen displayed after the operation screen determined by the operation screen determination portion is set occurs a predetermined number of times or more, add the search index to the screen information of the operation screen in which the setting value is firstly set by the setting portion.

10. The image processing apparatus according to claim 1, wherein
the processor further includes a display order determination portion that determines, in the case where the two or more operation screens are extracted by the operation screen extraction portion, display order of the two or more operation screens, and
the operation display control portion is configured to display the two or more extracted operation screens in ascending order of the determined display order until a setting value is set for the displayed operation screen by the setting portion.

11. The image processing apparatus according to claim 1, wherein
the screen information can be commonly used with another image processing apparatus, and
the operation screen extraction portion is configured to, in the case where the screen information has been changed by the other image processing apparatus, search the screen information that has been changed by the other image processing apparatus using the search key.

12. An operation assistance method allowing an image processing apparatus to perform:
a display control step of displaying any one of a plurality of operation screens;
a setting step of accepting a setting value defined for the displayed operation screen and setting the accepted setting value;
an operation screen extraction step of searching, using a search key, screen information respectively associating one or more search indexes with one or more operation screens being provided separately from the plurality of operation screens and among the plurality of the operation screens and extracting one or more operation screens among the plurality of operation screens;
an operation screen determination step of determining one operation screen from among the one or more extracted operation screens; and
a change step of changing the screen information based on an operation of a user accepted after the determined operation screen is displayed,
associating, in the case where a same search index is associated with two or more operation screens among the plurality of operation screens, first priorities with the two or more operation screens associated with the same search index,
in the case where two or more operation screens are extracted by a search using the search key used in the operation screen extraction step, determining an operation screen having a highest first priority among the first priorities respectively associated with the two or more extracted operation screens for every search index, which is commonly associated with the two or more extracted operation screens and includes the search key, among the two or more extracted operation screens, and
in the case where the two or more operation screens are extracted by the search using the search key used in the operation screen extraction step, a first operation screen determined from among the two or more operation screens by the first determination portion being displayed in the display, and then another second operation screen being displayed without setting of a setting value defined for the first operation screen, changing the first priority associated with the first operation screen for a search index, which is associated with the first operation screen and includes the search key, to a lower value.

13. The operation assistance program according to claim 12, wherein
the screen information can be commonly used with another image processing apparatus, and
the operation screen extraction step includes searching, in the case where the screen information has been changed by the other image processing apparatus, screen information that has been changed by the other image processing apparatus using the search key.

14. The operation assistance program according to claim 13, wherein
the screen information can be commonly used with another image processing apparatus, and
the operation screen extraction step includes searching, in the case where the screen information has been changed by the other image processing apparatus, screen information that has been changed by the other image processing apparatus using the search key.

15. A non-transitory computer-readable recording medium encoded with an operation assistance program executed by a processor controlling an image processing apparatus, wherein
the operation assistance program causes the hardware processor to execute:
a display control step of displaying any one of a plurality of operation screens;
a setting step of accepting a setting value defined for the displayed operation screen and setting the accepted setting value;
an operation screen extraction step of searching, using a search key, screen information respectively associating one or more search indexes with one or more operation screens being provided separately from the plurality of operation screens and among the plurality of the operation screens and extracting one or more operation screens among the plurality of operation screens;
an operation screen determination step of determining one operation screen from among the one or more extracted operation screens; and
a change step of changing the screen information based on an operation of a user accepted after the determined operation screen is displayed,
associating, in the case where a same search index is associated with two or more operation screens among the plurality of operation screens, first priorities with the two or more operation screens associated with the same search index,
in the case where two or more operation screens are extracted by a search using the search key used in the operation screen extraction step, determining an operation screen having a highest first priority among the first priorities respectively associated with the two or more extracted operation screens for every search index, which is commonly associated with the two or more extracted operation screens and includes the search key, among the two or more extracted operation screens, and in the case where the two or more operation screens are extracted by the search using the search key used in the operation screen extraction step, a first operation screen determined from among the two or more operation screens by the first determination portion being displayed in the display, and then another second operation screen being displayed without setting of a setting value defined for the first operation screen, changing the first priority associated with the first operation screen for a search index, which is associated with the first operation screen and includes the search key, to a lower value.

* * * * *